United States Patent
Lau et al.

(10) Patent No.: US 10,830,916 B2
(45) Date of Patent: Nov. 10, 2020

(54) GEOPHONE WITH MAGNETIC SELF-DAMPING SYSTEM

(71) Applicant: Halliburton Energy Services, Inc., Houston, TX (US)

(72) Inventors: Yong Fong Lau, Singapore (SG); Wei Hsuan Huang, Singapore (SG); Shi Jing Jackie Yeo, Singapore (SG); Ariane Wu, Singapore (SG)

(73) Assignee: Halliburton Energy Services, Inc., Austin, TX (US)

( * ) Notice: Subject to any disclaimer, the term of this patent is extended or adjusted under 35 U.S.C. 154(b) by 412 days.

(21) Appl. No.: 15/553,823

(22) PCT Filed: Mar. 25, 2015

(86) PCT No.: PCT/US2015/022587
§ 371 (c)(1),
(2) Date: Aug. 25, 2017

(87) PCT Pub. No.: WO2016/153509
PCT Pub. Date: Sep. 29, 2016

(65) Prior Publication Data
US 2018/0052243 A1    Feb. 22, 2018

(51) Int. Cl.
*G01V 1/18*    (2006.01)
*G01V 1/42*    (2006.01)

(52) U.S. Cl.
CPC ............ *G01V 1/183* (2013.01); *G01V 1/42* (2013.01)

(58) Field of Classification Search
None
See application file for complete search history.

(56) References Cited

U.S. PATENT DOCUMENTS

| 2,418,953 | A | * | 4/1947 | Raitt | G01V 1/18 367/185 |
| 2,424,724 | A | * | 7/1947 | Tolk | G01V 1/181 367/182 |
| 2,562,983 | A | * | 8/1951 | Clewell | G01V 1/181 367/182 |
| 3,067,404 | A | * | 12/1962 | Hildebrandt | G01V 1/181 367/182 |

(Continued)

FOREIGN PATENT DOCUMENTS

CN    1031135 A    2/1989

OTHER PUBLICATIONS

Onorato, P., P. Mascheretti, and A. DeAmbrosis. "Investigating the magnetic interaction with Geomag and Tracker Video Analysis: static equilibrium and anharmonic dynamics." European Journal of Physics 33.2 (2012): 385. (Year: 2012).*

(Continued)

*Primary Examiner* — Hovhannes Baghdasaryan
*Assistant Examiner* — Jonathan D Armstrong
(74) *Attorney, Agent, or Firm* — Gilliam IP PLLC

(57) ABSTRACT

A self-damping geophone, in some embodiments, comprises a housing containing a conductive coil and one or more springs; a first magnet suspended within said housing by the one or more springs, said conductive coil located within a magnetic field of the first magnet; and damping magnets disposed outside of said housing, each of the damping magnets oriented to repel a pole of the first magnet closest to that damping magnet.

20 Claims, 5 Drawing Sheets

(56) References Cited

U.S. PATENT DOCUMENTS

| | | | |
|---|---|---|---|
| 3,129,347 A | | 4/1964 | Tullio |
| 3,194,060 A | | 7/1965 | Greenwood |
| 3,296,589 A | * | 1/1967 | Ikrath .................... G01V 1/00 367/140 |
| 3,493,275 A | | 2/1970 | Stone et al. |
| 3,582,874 A | | 6/1971 | Fedoseenko |
| 4,412,317 A | * | 10/1983 | Asjes .................... G01V 1/181 367/154 |
| 4,517,514 A | | 5/1985 | Howell |
| 4,597,070 A | | 6/1986 | Redeker |
| 5,756,896 A | | 5/1998 | Schendel |
| 5,941,904 A | * | 8/1999 | Johnston ............... A61N 1/056 607/19 |
| 7,099,235 B2 | | 8/2006 | Kamata |
| 7,639,566 B2 | | 12/2009 | Kamata et al. |
| 8,111,870 B2 | * | 2/2012 | Lemarquand ......... H04R 9/025 381/412 |
| 2007/0107938 A1 | | 5/2007 | Cornish et al. |
| 2008/0074083 A1 | * | 3/2008 | Yarger ................. H01M 6/5033 320/137 |
| 2014/0301160 A1 | | 10/2014 | Kamata |
| 2018/0052243 A1 | * | 2/2018 | Lau ........................ G01V 1/42 |

OTHER PUBLICATIONS

"International Application Serial No. PCT /US2015/022587, International Preliminary Report on Patentability dated Jul. 13, 2017", 13 pages.

"International Application Serial No. PCT /US2015/022587, International Search Report dated Nov. 12, 2015", 3 pages.

"International Application Serial No. PCT /US2015/022587, Written Opinion dated Nov. 12, 2015", 11 pages.

AR Application Serial No. P160100600, Office Action, dated Jul. 30, 2019, 2 pages.

ID Application Serial No. P00201704987; Office Action; dated Jun. 21, 2019, 3 pages.

GB Application Serial No. GB1711840.7, Examination Report Under 18(3), dated Dec. 17, 2019, 3 pages.

GB Application Serial No. GB1711840.7, Intention to Grant Under 18(4), dated Feb. 18, 2020, 2 pages.

* cited by examiner

GEOPHONE WITH MAGNETIC SELF-DAMPING SYSTEM

BACKGROUND

Various types of tools are used to explore and assess subsurface formations for hydrocarbons. One such tool is the geophone, which is typically used in seismic applications (e.g., reflection seismology). A geophone is a type of motion transducer that converts detected seismic activity into electrical signals. Specifically, a typical geophone contains a spring-mounted magnet positioned within a conductive coil. Seismic activity causes the spring-mounted magnet to move, thereby generating an electrical signal in the coil that is proportional to the magnet's velocity. Thus, the electrical signal reflects the degree of seismic activity acting upon the geophone.

Geophones are sometimes deployed in seismic-while-drilling (SWD) applications. In a common SWD application, a geophone is coupled to a drill string, and, as drilling begins, the geophone is lowered into the subterranean formation. Once the geophone reaches the depth at which the seismic sensing is to be performed, drilling is temporarily halted, a seismic source (e.g., a controlled explosion at the Earth's surface) is induced, and the geophone measures the resulting seismic activity from its position downhole. To reach this depth at which seismic sensing is performed, the geophone experiences drilling and downhole conditions—such as drilling vibrations—as it "rides" the drill string to the target depth.

BRIEF DESCRIPTION OF THE DRAWINGS

Accordingly, there are disclosed in the drawings and in the following description a geophone with a magnetic self-damping system. In the drawings.

Figure 1:
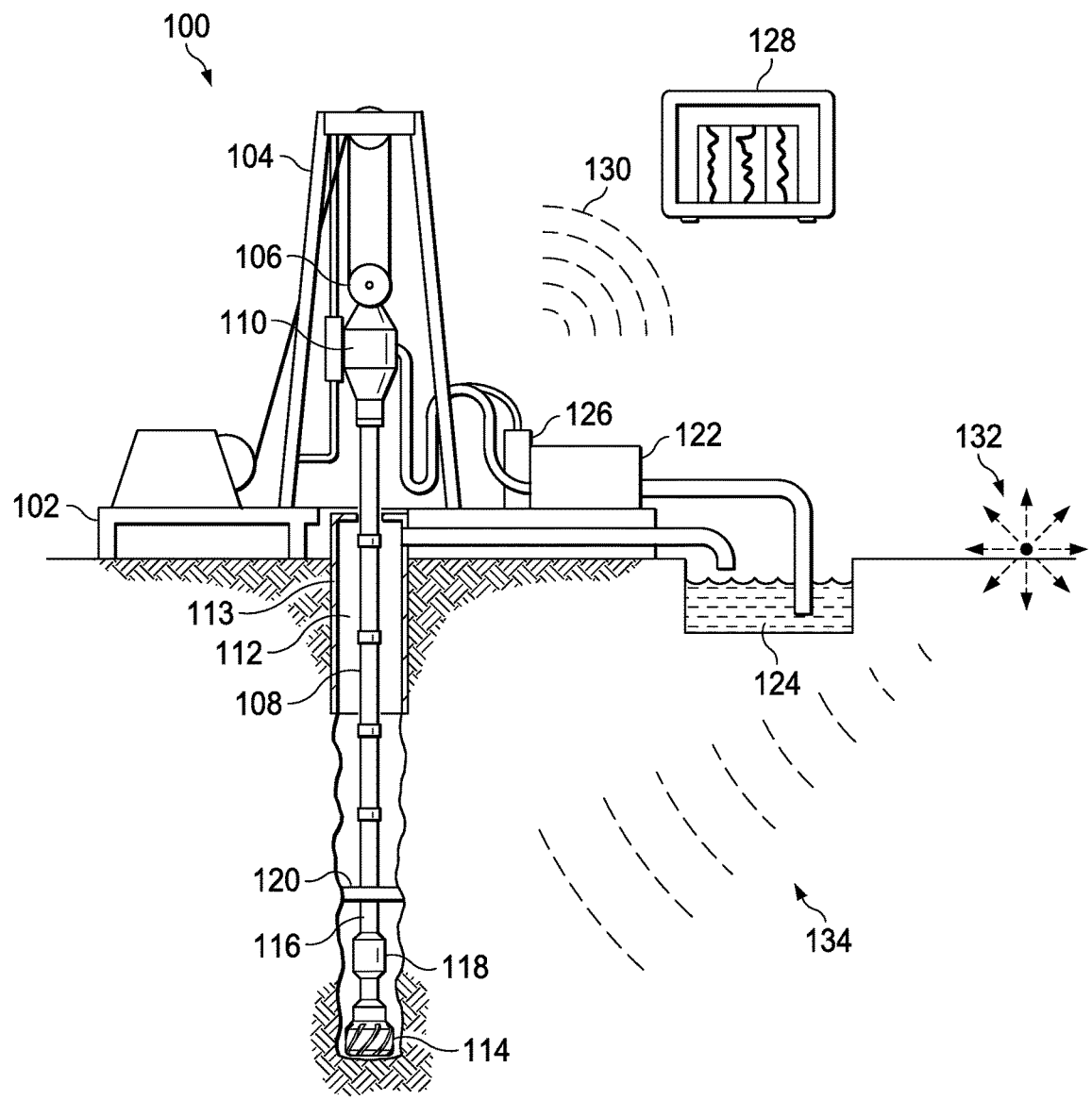
FIG. 1 is a schematic diagram of a drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein is a novel geophone with a magnetic self-damping system. The self-damping geophone generally includes a housing and a magnet suspended inside the housing using multiple coils. The magnet is adjacent to an electrically conductive coil. In some embodiments, the magnet may be disposed within—but not touching—the conductive coil, although any embodiment that generates a variable current in the conductive coil based on the movement of the magnet relative to the coil is contemplated and included within the scope of this disclosure.

The geophone further includes damping magnets on opposing ends of the geophone—that is, the ends of the geophone that align with the axis of the magnet's movement within the geophone. In many cases, the spring-suspended magnet will move in a vertical direction as a result of mechanical energy (e.g., seismic waves, drilling vibrations) acting upon the geophone. Thus, in such embodiments, the damping magnets will be located on the vertical ends of the geophone. In some embodiments, the damping magnets will be disposed outside of the geophone housing—for example, they may be coupled to the outer surfaces of the geophone housing. In some embodiments, the damping magnets will be disposed inside the geophone housing—for instance, they may be coupled to the inner surfaces of the geophone housing. Other embodiments are contemplated, such as those in which one of the damping magnets is coupled to an inner surface of the geophone housing and another damping magnet is coupled to an outer surface of the geophone housing, or such as those in which the damping magnets are coupled to other structures outside or inside the geophone housing besides the surfaces of the housing themselves. In any event, the damping magnets are oriented so that they repel the spring-suspended magnet as the magnet moves back and forth due to mechanical energy acting upon the geophone. For example, if the spring-suspended magnet has a north pole oriented toward the top of the geophone housing and a south pole oriented toward the bottom of the geophone housing, then a damping magnet coupled to the top of the housing will be oriented so that its north pole faces downward (i.e., toward the spring-suspended magnet's north pole) and a damping magnet coupled to the bottom of the housing will be oriented so that its south pole faces upward (i.e., toward the spring suspended magnet's south pole).

The strength of the damping magnets is selected based at least in part on the strength of the spring-suspended magnet and other relevant factors, e.g., expected mechanical energy stress on the geophone in the intended downhole application. Specifically, the damping magnets are selected to be strong enough to resist unnecessary movement of the spring-suspended magnet toward the ends of the geophone housing at which the damping magnets are disposed (e.g., to prevent impact of the spring-suspended magnet against the geophone housing; to prevent unnecessary spring wear and tear). At the same time, the damping magnet strengths are selected to permit proper movement of the spring-suspended magnet and a reliable frequency response (e.g., voltage potential across the two ends of the conductive coil as a result of various possible seismic wave frequencies).

In operation, the self-damping geophone is mounted on a drill string and the drill string is used to drill a borehole in a target formation. During the drilling operation, the geophone is subjected to harsh vibrations and mechanical impacts, but the damping magnets—each of which repels the spring-suspended magnet—prevents the spring-suspended magnet from colliding with the geophone housing and also reduces the wear and tear on the springs by impeding unnecessary movement of the spring-suspended magnet. In this way, damage to the geophone is reduced in comparison to the damage that would be sustained by a non-self-damping geophone. When the geophone within the drill string reaches a desired depth, drilling is stopped and a seismic event (natural or induced) is recorded using the geophone. Specifically, the seismic waves act upon the geophone, causing the spring-suspended magnet within the geophone to move within the geophone housing. Although the damping magnets have magnetic moments strong enough to preclude contact or excessive wear as described above, they are not so strong that they prevent proper movement of the spring-suspended magnet in response to seismic waves. (To facilitate proper seismic energy readings, the self-damping geophone may be tested to study its frequency response and the structure of the geophone—for example, the strength of the damping magnets—may be adjusted to calibrate the frequency response.)

FIG. 1 is a schematic of an illustrative drilling environment 100. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments, such as one or more of the self-damping geophones described herein. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 126. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased).

The drill collars in the BHA 116 are typically thick-walled steel pipe sections that provide weight and rigidity for the drilling process. The thick walls are also convenient sites for installing the arrays of transmitters and receivers (as described in greater detail below) and logging instruments that measure downhole conditions, various drilling parameters, and characteristics of the formations penetrated by the borehole. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable. Much of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 116 via mud pulse telemetry or any other suitable communication technique. The scope of disclosure is not limited to these particular examples of data processing units.

FIG. 1 further illustrates a seismic source 132, such as a controlled explosion, at the surface of the Earth. Any suitable distance between the borehole 112 and the seismic source 132 may be selected by drilling personnel. The seismic source 132 emits seismic waves 134. Although the seismic waves 134 shown in FIG. 1 propagate in the direction of the wellbore 112, in practice, such waves may propagate in all directions from the location of the seismic source 132. A geophone disposed within the drill string 108 receives these seismic waves 134 and records them as described below.

Figure 2A:
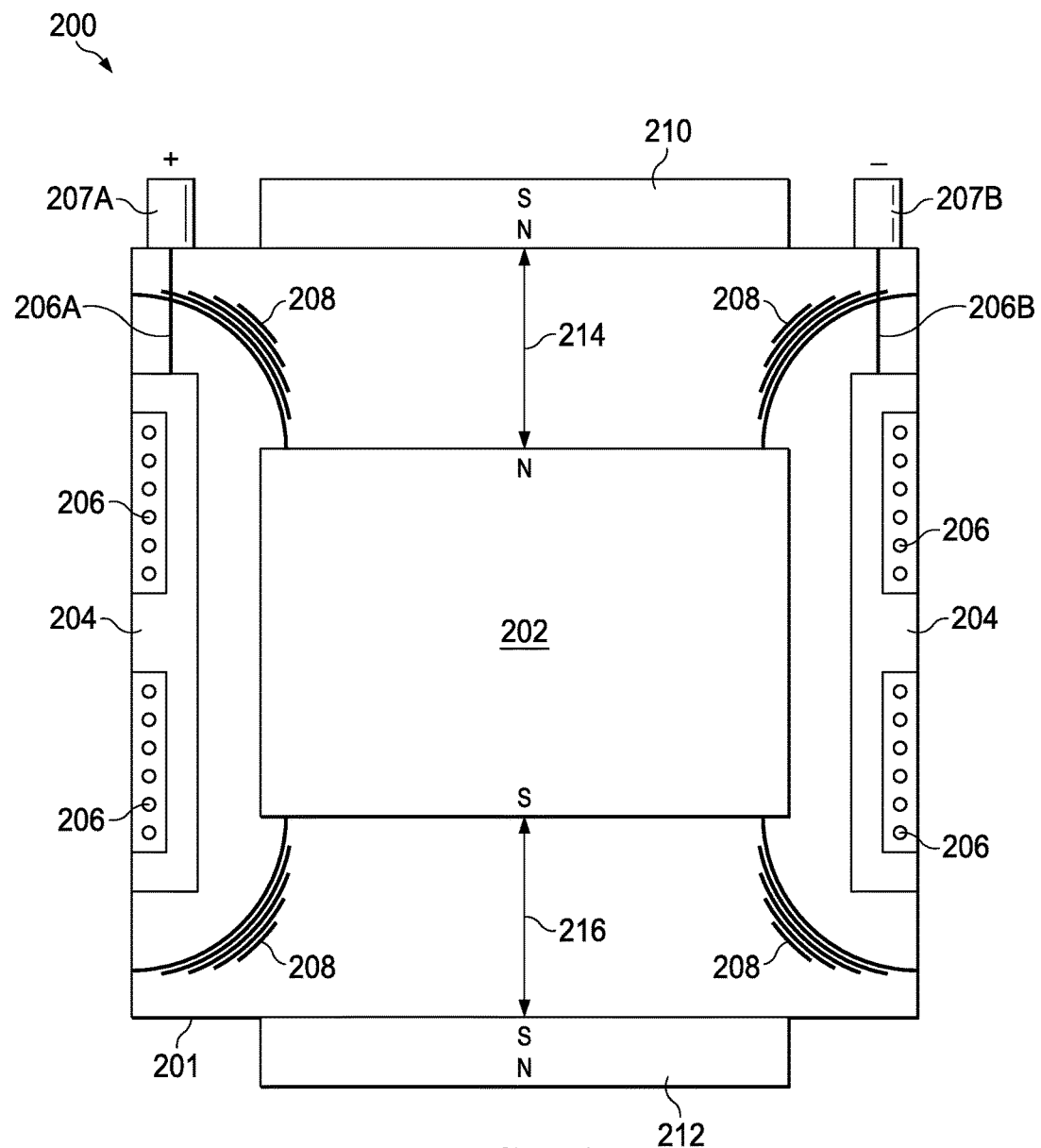
FIG. 2A is a schematic diagram of a self-damping geophone that includes external damping magnets.

FIG. 2A is a cross-sectional schematic diagram of a self-damping geophone 200. Specifically, the geophone 200 includes a cylindrical housing 201, a cylindrical moving magnet 202, a cylindrical stationary mass 204, and a conductive coil 206 wrapped around the stationary mass 204. The coil 206 has ends 206A and 206B, which electrically couple to leads 207A and 207B, respectively. The geophone 200 further includes springs (e.g., leaf springs) 208 that couple the magnet 202 to the housing 201, thereby suspending the magnet 202 in the air within the housing 201. As shown, the magnet 202 is disposed within the conductive coil 206, but it does not couple to the conductive coil 206. Other embodiments are contemplated and included within the scope of the disclosure, such as those in which the magnet 202 and conductive coil 206 are arranged in different configurations but that still keep the conductive coil 206 within the magnetic field of the magnet 202.

The geophone 200 further includes cylindrical damping magnets 210 and 212 which, at rest, are separated from the magnet 202 by distances 214 and 216, respectively. As shown, the damping magnets 210, 212 are oriented to repel the magnet 202—that is, the north poles of the damping magnet 210 and magnet 202 face each other, while the south poles of the damping magnet 212 and the magnet 202 face each other. As a result, movement of the magnet 202 in the vertical direction is restricted to an extent that depends on the strengths of the damping magnets 210, 212 and the lengths of distances 214, 216. Each of these values may be set in any suitable manner to facilitate a desired behavior of the magnet 202 in response to drilling vibrations and seismic waves. (In some embodiments, a ferromagnetic material may be positioned between the magnet 202 and each of the damping magnets 210, 212 to help calibrate the force between the magnets.) In addition, after these values have been determined and the self-damping geophone has been created, the frequency response of the geophone is studied prior to sending the geophone downhole so that electrical signals received from the geophone reflecting seismic activity may be properly interpreted.

In operation, the self-damping geophone 200—which is coupled to a drill string—moves downhole as the drilling process progresses. The springs 208 suspend the magnet 202 and thus permit the magnet 202 to move up and down in a vertical direction as a result of drilling vibrations. The damping magnet 210, however, repels the magnet 202 as the magnet 202 moves in the upward direction (i.e. toward the damping magnet 210), and the damping magnet 212 repels the magnet 202 as the magnet 202 moves in the downward direction (i.e., toward the damping magnet 212). As explained, the repulsion between the damping magnets 210, 212 and the magnet 202 depends on a number of adjustable factors that are considered during the design of the self-damping geophone, including, without limitation, the strengths of the damping magnets 210, 212 and the magnet 202; the lengths of distances 214, 216; the material with which the housing 201 is manufactured, etc. As the magnet 202 moves closer to either of the damping magnets 210, 212, the repulsion force grows exponentially, thereby allowing for generally unrestricted movement when the magnet 202 is at or near the center of the housing 201, but resisting movement of the magnet 202 with increasing force as the magnet 202 approaches either of the damping magnets 210, 212. In this way, because the movement of the magnet 202 is restricted, the wear and tear on the springs 208, magnet 202, and housing 201 is mitigated. As a result, the longevity of the geophone 200 is enhanced.

When the geophone 200 reaches its intended depth, drilling is stopped so that drilling vibrations do not interfere with the geophone's seismic measurements. As seismic waves—whether induced or natural—approach and affect the geophone 200, the magnet 202 moves vertically in an up-and-down motion with a particular velocity. The magnet 202 generates a magnetic field, and the motion of the magnet 202 relative to the conductive coil 206 affects the current flowing through the coil 206. The current in the coil 206 directly corresponds to the motion of the magnet 202. Thus, measuring the current in the coil 206 (or the voltage across the ends 206A, 206B of the coil, measured using leads 207A, 207B) provides information regarding the motion of the magnet 202, which, in turn, provides information about the seismic activity affecting the geophone 200. (A resistor or other load, not specifically shown, may be placed along the coil 206 to provide a potential across coil ends 206A, 206B.) Because the frequency response of the geophone 200 is known, the signals received from the geophone 200 may be used to determine properties of the seismic waves affecting the geophone 200.

Figure 2B:
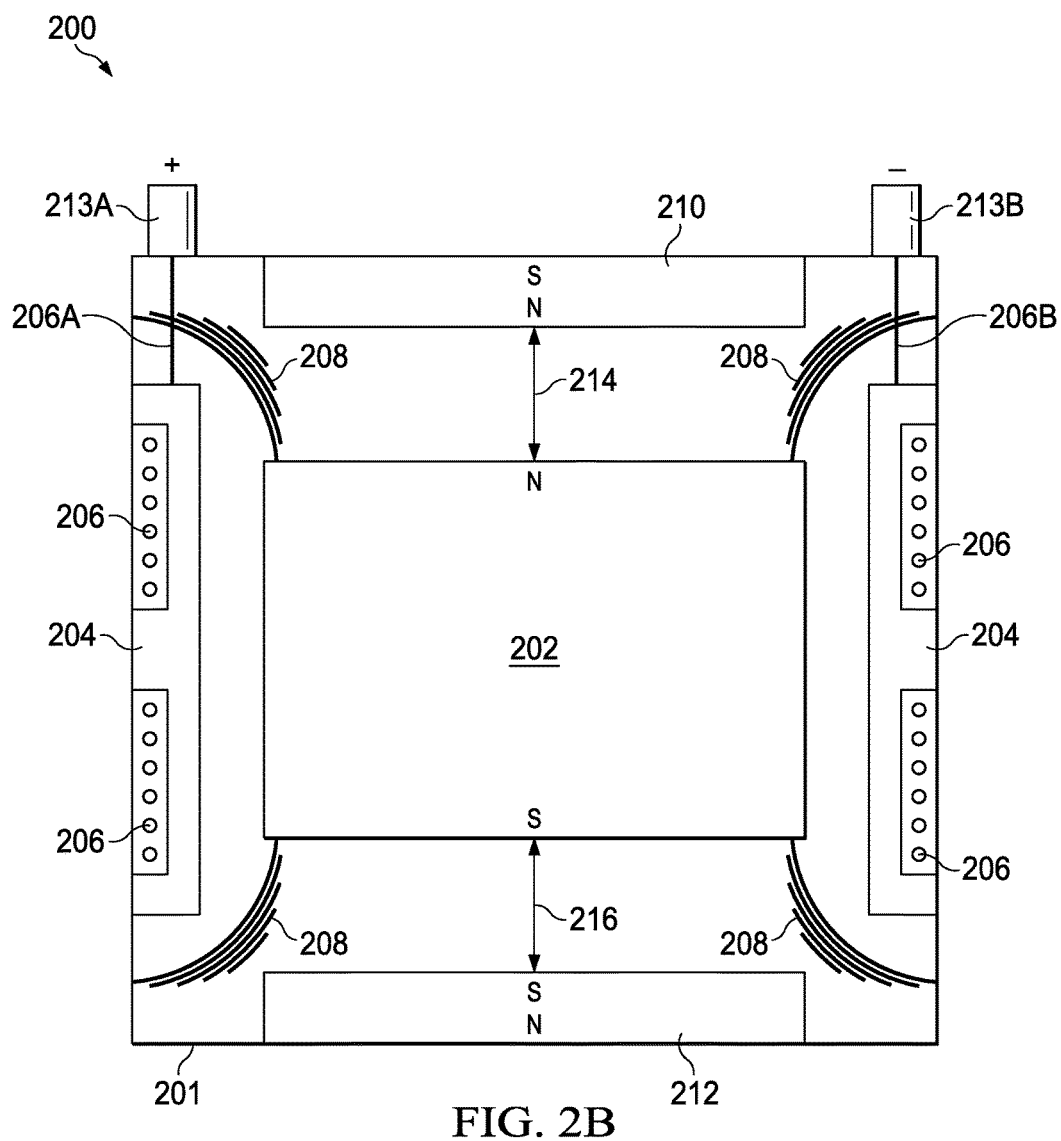
FIG. 2B is a schematic diagram of a self-damping geophone that includes internal damping magnets.

FIG. 2B is a schematic diagram describing other embodiments of the self-damping geophone 200. Specifically, in such embodiments, the geophone 200 is virtually identical to the geophone 200 shown in FIG. 2A. The damping magnets 210, 212, however, are disposed within the housing 201. Specifically, the damping magnet 210 is coupled to an inner surface of the housing 201 so that it opposes the upward motion of the magnet 202, and the damping magnet 212 is coupled to an inner surface of the housing 201 so that it opposes the downward motion of the magnet 202. Incorporating the damping magnets inside the housing 201 improves the profile of the geophone 200 and reduces the amount of space required to accommodate the geophone 200 in the drill string. In addition, the damping magnets are protected by the housing 201.

Figure 3:
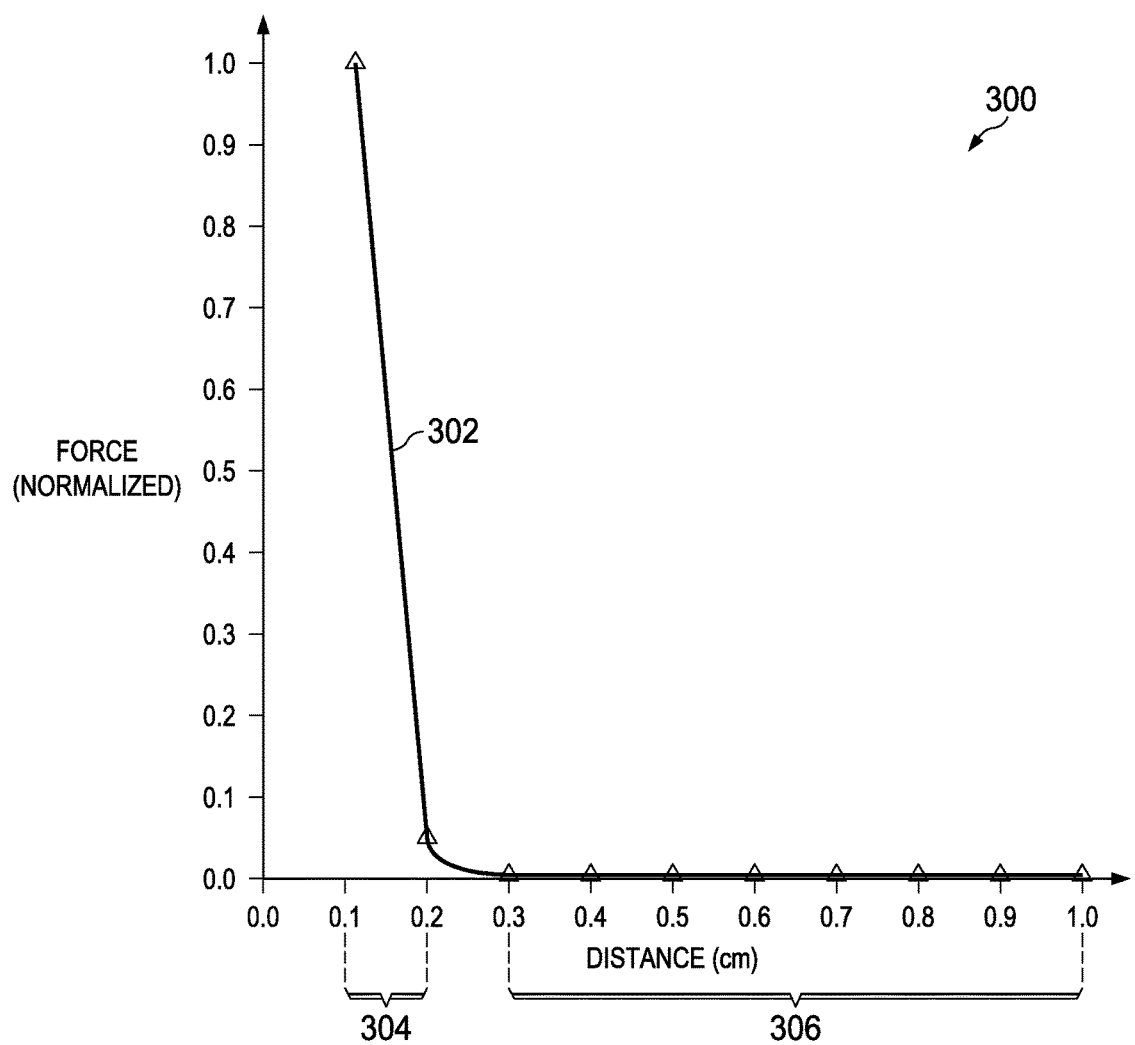
FIG. 3 is a graph indicating a force between geophone magnets as a function of the distance between the magnets.

FIG. 3 is a graph 300 indicating a force between geophone magnets as a function of the distance between the magnets. The graph 300 includes an x-axis representing distance between any two cylindrical magnets (e.g., distances 214, 216 shown in FIGS. 2A and 2B) and a y-axis representing normalized force between those magnets. Thus, for example, the curve 302 on graph 300 represents the behavior of the force between, e.g., damping magnet 210 and magnet 202 as the distance between them varies. The curve 302 is based on the following equation for the force between the magnet 202 and a damping magnet:

$$F(z, m_1, m_2) = -\frac{3\mu_0 m_1 m_2}{2\pi z^4} \quad (1)$$

where z is the distance between the magnetic poles, $m_1$ and $m_2$ are the dipole moments of the magnets, and $\mu_0$ is the permeability of the material between the magnets. This equation and the curve 302 may be used to select strengths of the damping magnets 210, 212 and distances 214, 216 to achieve a desired behavior of the magnet 202 in response to drilling vibrations and seismic waves.

The curve 302 includes a portion 304, which represents a heavy damping zone. In the heavy damping zone, the damping magnet is located close to the magnet 202 and the force between the two magnets is relatively strong, thus preventing or at least impeding the magnet 202 from making contact with any other object (e.g., the housing 201 or the damping magnet, depending on the location of the damping magnet inside or outside the housing). As the distance between the magnets increases, the force between the magnets drops exponentially (i.e., at the rate of $z^4$, where z is the distance between the repelling poles of the magnets), and in the no damping zone 306, movement of the magnet 202 is minimally restricted, if at all. As explained, the behavior of the curve 302—that is, the interaction between the magnet 202 and the damping magnets 210, 212—may be calibrated as desired by manipulating the strengths of these magnets, the distances between the magnets, and/or the permeability of the material between the magnets.

Figure 4:
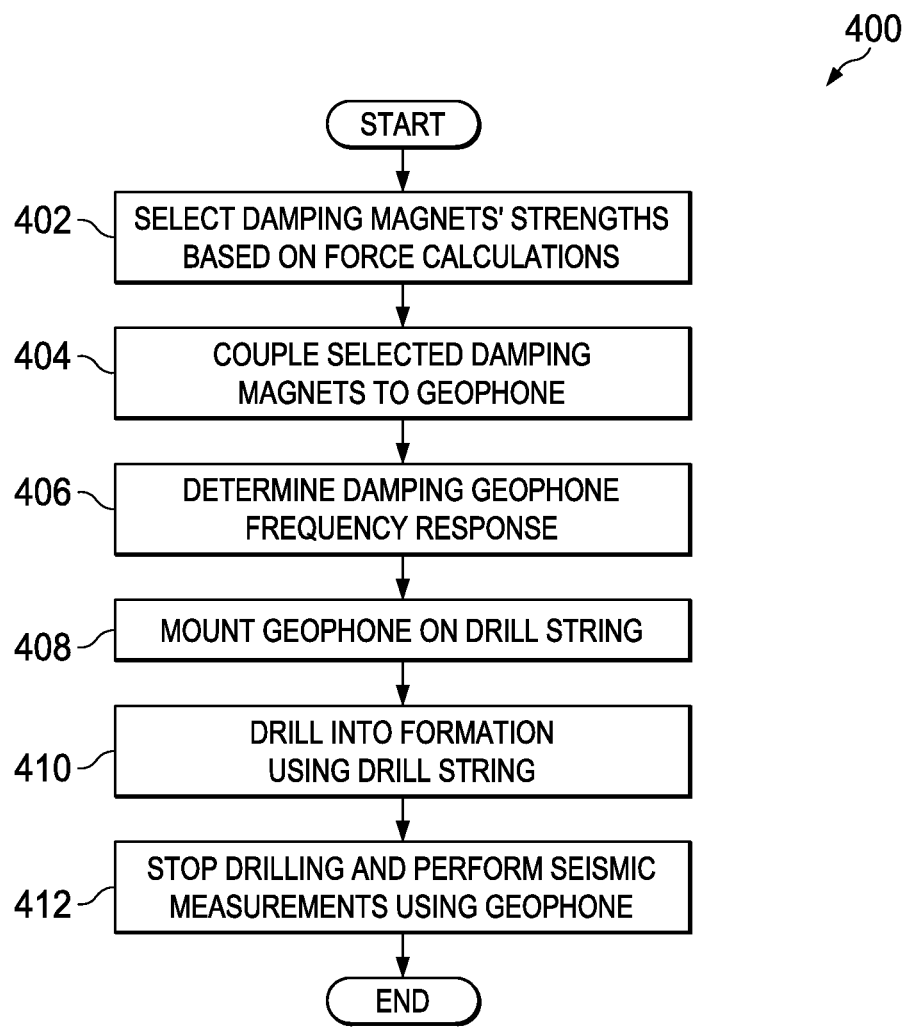
FIG. 4 is a flow diagram of a method for making and using the self-damping geophone.

FIG. 4 is a flow diagram of a method 400 for making and using the self-damping geophone 200. The method 400 begins with selecting the damping magnets' strengths based on the force calculations described above (step 402). The method 400 next includes coupling the selected damping magnets to the geophone (step 404). The distance between the damping magnets and the magnet 202 is selected as desired, at least in part based on the force calculation described above. As described with respect to FIGS. 2A and 2B, the damping magnets may be coupled on the outside or the inside of the housing of the geophone. In some embodiments, one damping magnet is coupled on the outside of the housing and another damping magnet is coupled on the inside of the housing. Any and all such permutations are included within the scope of the disclosure.

The method 400 then includes determining the geophone's frequency response (step 406). The frequency response may vary based on a variety of factors, including, without limitation, the strength of the springs 208 used to suspend the magnet 202, the distances between the damping magnets and the magnet 202, the strengths of all magnets, the permeability of material between the damping magnets and the magnet 202, the characteristics of the conductive coil 206, etc. The geophone's frequency response is studied so that seismic measurements captured later may be properly interpreted. The method 400 then includes mounting the self-damping geophone on the drill string (step 408). In at least some embodiments, the geophone is housed within the bottomhole assembly (BHA), although other possibilities are contemplated. The drill string is then used to drill into the target formation (step 410), and the method 400 concludes by stopping the drilling and performing seismic measurements using the self-damping geophone (step 412). Measurements obtained from the self-damping geophone may be recorded downhole for later extraction at the surface, transported using a telemetry technique (e.g., mud-pulse telemetry), or conveyed using slickline services. Other known communication techniques also may be used as suitable.

Although the foregoing embodiments and figures describe the springs 208 as suspending a magnet 202 within the geophone while the mass 204 and coil 206 remain stationary, in some embodiments, the springs 208 may couple to the coil-wrapped mass 204 while the magnet 202 remains stationary. In such embodiments, drilling vibrations and seismic waves cause the mass 204 and the coil 206 to move in a vertical direction, and the magnetic field generated by the movement of the coil 206 is repelled using the damping magnets, as described above. Any such variations may be appropriate and included within the scope of this disclosure as long as the moving member within the geophone can be repelled using the damping magnets, the movement of that member results in relative movement between the magnet 202 and the coil 206, and the frequency response of the completed geophone is studied prior to sending the geophone downhole.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

At least some of the embodiments in the present disclosure are directed to a self-damping geophone, comprising: a housing containing a conductive coil and one or more springs; a first magnet suspended within said housing by the one or more springs, said conductive coil located within a magnetic field of the first magnet; and damping magnets disposed outside of said housing, each of the damping magnets oriented to repel a pole of the first magnet closest to that damping magnet. Such embodiments may be supplemented in a variety of ways, including by adding any or all of the following concepts, in any sequence and in any combination: wherein the damping magnets repel the first magnet such that they impede contact between the first magnet and the housing; wherein a force between the first magnet and at least one of the damping magnets varies based on a distance between the first magnet and the at least one of the damping magnets; wherein, between a first value of said distance and a second value of said distance, said force decreases, and between a third value of said distance and a fourth value of said distance, said force is constant; wherein the geophone is housed within a drill string; wherein at least one of the one or more springs is a leaf spring; wherein the first magnet is disposed within the conductive coil and is electrically independent of the conductive coil; wherein the damping magnets are disposed on outer surfaces of the housing.

At least some of the embodiments in the present disclosure are directed a self-damping geophone, comprising: a housing containing a conductive coil and one or more springs; a first magnet suspended within the housing by said one or more springs, said conductive coil located within a magnetic field of the first magnet; and damping magnets disposed inside said housing, each of the damping magnets oriented to repel a pole of the first magnet closest to the damping magnet. Such embodiments may be supplemented in a variety of ways, including by adding any or all of the following concepts, in any sequence and in any combination: wherein the damping magnets repel the first magnet such that they impede contact between the first magnet and either of the damping magnets; wherein a force between the first magnet and at least one of the damping magnets varies based on a distance between the first magnet and the at least one of the damping magnets; wherein, between a first value of said distance and a second value of said distance, said force changes by a rate of $z^4$, and wherein z is the difference between the first and second values of said distance; wherein the geophone is housed within a drill string; wherein the first magnet is disposed within the conductive coil but does not contact the conductive coil; wherein the damping magnets are disposed on inner surfaces of the housing.

At least some of the embodiments in the present disclosure are directed to a method for protecting a geophone from vibration-induced damage, comprising: selecting a damping magnet based on a strength of the damping magnet and a strength of a first magnet suspended by springs within a geophone housing; coupling the damping magnet to the geophone housing, the damping magnet oriented such that the damping magnet resists movement of the first magnet toward the damping magnet; coupling the geophone to a drill string; using the drill string to drill a borehole such that the geophone is disposed within the borehole; and using the geophone to perform a seismic measurement. Such embodiments may be supplemented in a variety of ways, including by adding any or all of the following concepts, in any sequence and in any combination: wherein the sides of the damping magnet and the first magnet that are closest to each other share a common pole type; wherein, during the drilling of said borehole, the damping magnet precludes contact between the first magnet and either the damping magnet or the geophone housing; wherein the damping magnet couples to an outer surface of the geophone housing; wherein the damping magnet couples to an inner surface of the geophone housing.

The following is claimed:

1. A self-damping geophone, comprising:
 a housing containing a conductive coil and one or more springs;
 a first magnet suspended within said housing by the one or more springs, said conductive coil located within a magnetic field of the first magnet; and
 damping magnets disposed outside of said housing, each of the damping magnets oriented to repel a pole of the first magnet closest to that damping magnet;
 wherein the strengths of the first magnet and damping magnets, the distance between the first magnet and damping magnets, and the permeability of material between the first magnet and the damping magnets are selected to prevent collision between the first magnet and the housing and to provide a zone in which movement of the first magnet is minimally restricted by the damping magnets.

2. The geophone of claim 1, wherein the damping magnets repel the first magnet such that they impede contact between the first magnet and the housing.

3. The geophone of claim 1, wherein a force between the first magnet and at least one of the damping magnets varies based on a distance between the first magnet and the at least one of the damping magnets.

4. The geophone of claim 3, wherein, between a first value of said distance and a second value of said distance, said force decreases, and between a third value of said distance and a fourth value of said distance, said force is constant.

5. The geophone of claim 1, wherein the geophone is housed within a drill string.

6. The geophone of claim 1, wherein at least one of the one or more springs is a leaf spring.

7. The geophone of claim 1, wherein the first magnet is disposed within the conductive coil and is electrically independent of the conductive coil.

8. The geophone of claim 1, wherein the damping magnets are disposed on outer surfaces of the housing.

9. A self-damping geophone, comprising:
- a housing containing a conductive coil and one or more springs;
- a first magnet suspended within the housing by said one or more springs, said conductive coil located within a magnetic field of the first magnet; and
- damping magnets disposed inside said housing, each of the damping magnets oriented to repel a pole of the first magnet closest to the damping magnet;
- wherein the strengths of the first magnet and damping magnets, the distance between the first magnet and damping magnets, and the permeability of material between the first magnet and the damping magnets are selected to prevent collision between the first magnet and the housing and to provide a zone in which movement of the first magnet is minimally restricted by the damping magnets.

10. The geophone of claim 9, wherein the damping magnets repel the first magnet such that they impede contact between the first magnet and either of the damping magnets.

11. The geophone of claim 9, wherein a force between the first magnet and at least one of the damping magnets varies based on a distance between the first magnet and the at least one of the damping magnets.

12. The geophone of claim 11, wherein, between a first value of said distance and a second value of said distance, said force changes by a rate of $z^4$, and wherein z is the difference between the first and second values of said distance.

13. The geophone of claim 9, wherein the geophone is housed within a drill string.

14. The geophone of claim 9, wherein the first magnet is disposed within the conductive coil but does not contact the conductive coil.

15. The geophone of claim 9, wherein the damping magnets are disposed on inner surfaces of the housing.

16. A method for protecting a geophone from vibration-induced damage, comprising:
- selecting damping magnets and a first magnet suspended by springs within a geophone housing, wherein a strength of the first magnet suspended by springs within the geophone housing, the distance between the first magnet and damping magnets when coupled to the geophone, and the permeability of material between the first magnet and the damping magnets when coupled to the geophone prevent collision between the first magnet and the housing and provide a zone in which movement of the first magnet is minimally restricted by the damping magnet;
- coupling the damping magnet to the geophone housing, the damping magnet oriented such that the damping magnet resists movement of the first magnet toward the damping magnets;
- coupling the geophone to a drill string;
- using the drill string to drill a borehole such that the geophone is disposed within the borehole; and
- using the geophone to perform a seismic measurement.

17. The method of claim 16, wherein the sides of the damping magnets and the first magnet that are closest to each other share a common pole type.

18. The method of claim 16, wherein, during the drilling of said borehole, the damping magnets preclude contact between the first magnet and either the damping magnets or the geophone housing.

19. The method of claim 16, wherein the damping magnets couple to an outer surface of the geophone housing.

20. The method of claim 16, wherein the damping magnets couple to an inner surface of the geophone housing.

* * * * *

UNITED STATES PATENT AND TRADEMARK OFFICE
CERTIFICATE OF CORRECTION

PATENT NO. : 10,830,916 B2  
APPLICATION NO. : 15/553823  
DATED : November 10, 2020  
INVENTOR(S) : Yong Fong Lau et al.

Page 1 of 1

It is certified that error appears in the above-identified patent and that said Letters Patent is hereby corrected as shown below:

On the Title Page

Item (73) Assignee, please replace "Austin, TX" with --Houston, TX--

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*